(12) United States Patent
Yokelson et al.

(10) Patent No.: US 6,358,620 B1
(45) Date of Patent: Mar. 19, 2002

(54) UNSATURATED POLYESTER RESIN COMPOSITIONS

(75) Inventors: Howard B. Yokelson, Naperville; James Van Fleet, Aurora; Karen E. Medema, Lemont, all of IL (US)

(73) Assignee: BP Corporation North America Inc., Chicago, IL (US)

(*) Notice: Subject to any disclaimer, the term of this patent is extended or adjusted under 35 U.S.C. 154(b) by 0 days.

(21) Appl. No.: 09/517,403

(22) Filed: Mar. 2, 2000

(51) Int. Cl.$^7$ .............................................. B32B 27/06
(52) U.S. Cl. ...................................................... 428/480
(58) Field of Search ................................. 528/297, 300, 528/302, 306, 307, 308, 308.6; 525/43, 44, 168, 437, 445; 52/323, 328.5; 524/425, 430, 445, 450, 451; 428/480

(56) References Cited

U.S. PATENT DOCUMENTS

| | | | |
|---|---|---|---|
| 3,641,201 A | 2/1972 | Heilman | 260/867 |
| 4,948,821 A | 8/1990 | DeKoning et al. | 523/500 |
| 5,373,058 A | 12/1994 | Hager et al. | 525/168 |
| 5,420,205 A | 5/1995 | Becker et al. | 525/168 |
| 5,747,607 A | 5/1998 | Hager et al. | 525/445 |

OTHER PUBLICATIONS

Amoco Chemical Company, Isophthalic Acid, Bulletin IP–86c, 1995.
Amoco Chemical Company, How Ingredients Influence Unsaturated Polyester Poprerties, Bulletin IP–70c, 1999.

*Primary Examiner*—Samuel A. Acquah
(74) *Attorney, Agent, or Firm*—James R. Henes; Mary Jo Kanady; Frederick S. Jerome

(57) ABSTRACT

This invention is chemically resistant thermosetting resins having low contents of volatile organic components comprising (i) a minor amount by weight of ethylenically unsaturated reactive solvent, (ii) a major amount by weight of an unsaturated polyester produced by a process which comprises; (a) condensing dihydric alcohol with at least one dicarboxylic acid and/or anhydride of dicarboxylic acid to form a condensation polymer having an acid number (AN) in a range upward from about 5 mg KOH/g polymer, and (b) reacting the condensation polymer with an amount of glycidyl methacrylate such that the weight ratio of glycidyl methacrylate to condensation polymer is in a range of from about 0.001 AN to about 0.005 AN.

13 Claims, No Drawings

UNSATURATED POLYESTER RESIN COMPOSITIONS

FIELD OF THE INVENTION

This invention relates to chemically resistant thermosetting resin having very low contents of volatile organic components. More particularly, this invention relates to improved unsaturated polyester resins, particularly unsaturated isophthalate polyester resin compositions, which are suitable components for products having low contents of ethylenically unsaturated reactive solvent-monomer. Thermosetting resins of the invention with reduced content of styrene monomer and the improved unsaturated polyesters have demonstrated excellent physical properties and retention of strength and hardness in corrosive environments.

BACKGROUND OF THE INVENTION

A versatile family of thermosetting materials known as unsaturated polyester resins comprise low molecular weight polyester polymers derived from unsaturated dibasic acids and/or anhydrides dissolved in unsaturated vinyl monomers. While dominant uses of unsaturated polyester resins are in conjunction with glass fiber or carbon fiber reinforcement to form laminar composites, unsaturated polyester resins are also used in casting processes, which usually contain high loadings of fillers or mineral aggregate.

Properties of thermosetting materials formed by the step growth esterification of glycols and dibasic acids can be manipulated widely by the choice of coreactant raw materials. Reactivity fundamental to the majority of commercial resins is derived from maleic anhydride as the unsaturated component in the unsaturated polyester, and styrene as dilutent and coreactant monomer. Propylene glycol is the principal glycol used in most compositions, and orthophthalic anhydride is the principal dibasic acid incorporated to moderate the reactivity and performance of the final resins. Although phthalic resins find wide application in ambient fabrication processes, isophthalic resins are more widely used in products employing high temperature forming processes.

Substitution of isophthalic acid for phthalic anhydride provides enhanced mechanical and thermal performance and improved resistance to corrosive environments, which are significant properties for a variety of products including underground gasoline storage tanks and large diameter sewer and water pipe.

However, the melting point of the higher molecular weight isophthalic polymer is much higher than orthophthalic resins, and blending temperatures in styrene must be increased to avoid freezing the polymer out. Due to the high molecular weight and high viscosity of these isopolyester resins in styrene, larger amounts of styrene are necessary to control viscosity of the blend.

Increasingly stringent policies and regulations for protection of the environment have increased need for thermosetting materials, particularly unsaturated polyester resins, having very low contents of volatile organic components, that is, having very low VOCs ("volatile organic contents"). For example, unsaturated isopolyester resins are desired in laminar composites with glass fiber reinforcement to enhance thermal endurance as well as to produce stronger, more resilient cross-linked plastics that demonstrate improved resistance to chemical attack. Since unsaturated isopolyester resin often makes up a substantial part of the composition as a whole, resin having very low contents of volatile organic components is quite important to achieving very low VOC for the composition as a whole.

However, it has been difficult to achieve desired low VOC in cross-linked plastics employing unsaturated polyester resins, particularly in systems employing a combination of unsaturated isopolyester with styrene as dilutent and coreactant monomer. Removal of styrene from compositions containing isopolyester resins in attempting to achieve a low VOC generally is accompanied by significant drawbacks that include causing viscosity of the resin compositions to increase to a undesirable extent, and/or loss of required physical and corrosion resistant properties.

There is, therefore, a present need for thermosetting resin compositions having low contents of volatile organic components.

It is desirable that improved unsaturated polyester resins, particularly unsaturated isophthalate polyester resin, should be suitable components for products having low contents of ethylenically unsaturated reactive solvent-monomer. For example, unsaturated isopolyester resins, which are desired in laminar composites with glass fiber reinforcement to enhance thermal endurance, should, as well, produce stronger, more resilient cross-linked plastics that demonstrate improved resistance to chemical attack.

Advantageously, such improvements shall be combined in a thermosetting resin with reduced content of styrene monomer which improved composition can demonstrate excellent physical properties, retention of strength, and hardness in corrosive environments

SUMMARY OF THE INVENTION

This invention is directed to overcoming the problems set forth above in order to provide thermosetting resin having low contents of volatile organic components. It is desirable to have an unsaturated polyester resin, particularly unsaturated isophthalate polyester resin composition, which is a suitable component for thermosetting products having low contents of ethylenically unsaturated reactive solvent-monomer, yet has excellent physical properties and retention of strength and hardness in corrosive environments.

Preferably, thermosetting resins of this invention have a Brookfield viscosity of less than about 1500 cps at 25° C., more preferably less than about 1200 cps, and most preferably less than about 1000 cps.

Aspects of this invention include chemically resistant thermosetting resins having low contents of volatile organic components comprising (i) a minor amount by weight of ethylenically unsaturated reactive solvent, (ii) a major amount by weight of unsaturated polyester.

Unsaturated polyester of the invention is produced by a process which comprises (a) condensing dihydric alcohol with at least one dicarboxylic acid and/or anhydride of dicarboxylic acid to form a polymer of esterification having an acid number in a range upward from about 5 mg KOH/g polymer, and (b) reacting the polymer of esterification with an amount of glycidyl methacrylate to form unsaturated polyester having an acid number in a range downward from about 15 mg KOH/g unsaturated polyester. Preferably, the unsaturated polyester has an acid number which is in a range from about 1 to about 15 mg KOH/g of unsaturated polyester, more preferably acid number is in a range from about 1 to about 10, and most preferably acid number of the unsaturated polyester is in a range from about 1 to about 5 mg KOH/g of unsaturated polyester.

Weight ratios of glycidyl methacrylate to the polymer of esterification generally are in a range downward from about 0.005 AN, i.e., the product of 0.005 and the acid number of the polymer of esterification. Preferably, the weight ratio of glycidyl methacrylate to the polymer of esterification is in a range of from about 0.001 AN to about 0.005 AN. More preferably, the weight ratio of glycidyl methacrylate to the polymer of esterification is in a range of from about 0.001 AN to about 0.004 AN, and most preferably, from about 0.001 AN to about 0.003 AN.

Preferably, the polymer of esterification is formed by a process which comprises initially condensing a dihydric alcohol containing from 2 to 10 carbon atoms and an aromatic dicarboxylic acid while distilling off water of condensation to form a melt of polymer having an acid number in a range from about 5 to about 15 mg KOH/g of polymer, and then condensing the polymer with unsaturated dicarboxylic acid and/or anhydride of unsaturated dicarboxylic acid and or anhydride while distilling off water of condensation to form the polymer of esterification having an acid number, AN, in a range upward from about 10 mg KOH/g polymer.

One aspect of this invention is a chemically resistant thermosetting resin, having low contents of volatile organic components comprising (i) about 35 to about 45 parts by weight of ethylenically unsaturated reactive solvent, and (ii) about 65 to about 55 parts by weight of an unsaturated polyester produced by a process which comprises (a) initially condensing dihydric alcohol containing from 2 to 10 carbon atoms and isophthalic acid while distilling off water of condensation to form a melt of polymer having an acid number in a range from about 5 to about 15 mg KOH/g polymer, then condensing the polymer and maleic anhydride while distilling off water of condensation to form a polymer of esterification having an acid number, AN, of at least 10, and (b) further reacting the polymer of esterification with an amount of glycidyl methacrylate such that the weight ratio of glycidyl methacrylate to condensation polymer is in a range of from about 0.001 AN to about 0.004 AN to form unsaturated isopolyester having an acid number in a range from about 1 to about 15 mg KOH/g of unsaturated polyester. Preferably, polymer of esterification has an acid number in a range from about 10 to about 30 mg KOH/g of polymer, and more preferably AN is in a range from about 15 to about 25.

Another aspect of the invention is a composite composition having resistance to chemical attack comprising: about 25 to about 500 parts by weight of fibrous reinforcement material and/or filler; about 35 to about 45 parts by weight of ethylenically unsaturated reactive solvent; and about 65 to about 55 parts by weight of an unsaturated polyester. Advantageously, the unsaturated polyester is produced by a process comprising: (1) initially condensing dihydric alcohol containing from 2 to 10 carbon atoms and isophthalic acid while distilling off water of condensation to form a melt of polymer having an acid number in a range from about 5 to about 15 mg KOH/g polymer, (2) then condensing the polymer and maleic anhydride while distilling off water of condensation to form a polymer of esterification having an acid number, AN, in a range from about 15 to about 25 mg KOH/g polymer, and (3) further reacting the polymer of esterification with an amount of glycidyl methacrylate such that the weight ratio of glycidyl methacrylate to condensation polymer is in a range of from about 0.001 AN to about 0.004 AN to form unsaturated isopolyester having an acid number in a range from about 1 to about 10 mg KOH/g unsaturated polyester invention.

For a more complete understanding of the present invention, reference should now be made to the embodiments illustrated in greater detail and described below by way of examples of the invention.

BRIEF DESCRIPTION OF THE INVENTION

In the chemically resistant thermosetting resins of this invention the ethylenically unsaturated reactive solvent comprises any material that can copolymerize with the unsaturated polyester. The ethylenically unsaturated reactive solvent that copolymerize with the unsaturated polyesters of this invention include at least one member of the group consisting of styrene, vinyl toluene, t-butylstyrene, chlorostyrene, divinyl benzene, α-methylstyrene, diacetoneacrylamide, hydroxyethyl acrylate, hydroxypropyl acrylate, methacrylate, methyl methacrylate, butyl methacrylate, and butyl acrylate.

Preferably, the ethylenically unsaturated reactive solvent comprises styrene or vinyl toluene, and the amount of the solvent-monomer is in a range of from 25 to 45 percent by weight of the resin. More preferably, the amount of ethylenically unsaturated reactive solvent is in a range of from 35 to 45 percent by weight of the resin.

Polyhydric alcohols that are useful in preparing the polyesters include diols, triols and higher functionality alcohols. Preferably, the dihydric alcohol is at least one member of the group consisting of ethylene glycol, propylene glycol, neopentyl glycol, 1,3-butane diol, 1,4-butane diol, diethylene glycol, dipropylene glycol, trimethylpentane diol, and trimethylene diol. More preferably, the dihydric alcohol is at least one member of the group consisting of ethylene glycol, propylene glycol, neopentyl glycol, 1,3-butane diol, 1,4-butane diol, diethylene glycol, dipropylene glycol, and trimethylpentane diol. Most preferably, the dihydric alcohol is at least one member of the group consisting of ethylene glycol, propylene glycol, neopentyl glycol. Propylene glycol offers good physical properties at low cost. Better weathering and improved resistance to alkaline chemicals can be achieved by using neopentyl glycol.

Polycarboxlyic acids that are useful in preparing the polyesters include dicarboxylic acids or anhydrides, dicarboxylic acid halides and dicarboxylic esters. Preferably, the aromatic dicarboxylic acid and/or anhydride is at least one member of the group consisting of orthophthalic acid, isophthalic acid, terephthalic acid and orthophthalic anhydride.

Suitable unsaturated polycarboxylic acids, and their corresponding anhydrides and acid halides that contain polymerizable carbon-to-carbon double bonds include maleic anhydride, maleic acid and fumaric acid. Preferably, the aromatic dicarboxylic acid is isophthalic acid and the unsaturated dicarboxylic anhydride is maleic anhydride, and more preferably the unsaturated polyester has an acid number in a range from downward from about 10 mg KOH/g of unsaturated polyester.

DESCRIPTION OF THE PREFERRED EMBODIMENTS

Isophthalic resins are manufactured by two-stage processing to facilitate the dissolution of the isophthalic acid. In the first stage, the glycol and isophthalic acid react at temperatures of 210° C. under an inert atmosphere to produce a clear melt. High pressure processing (207 kPa (30 psi)) and esterification catalysts such as hydrated monobutyl tin oxide are also widely employed to reduce the cycle times of two-stage processing. Maleic anhydride is added in the second stage and the final resin completed at 240° C. to control color and molecular weight development. Isophthalic resins intended for corrosion application are processed to the highest molecular weight as can meet viscosity requirements a given styrene content. Reaction cycle is about 24 hours.

The polyesterification reaction is normally carried out in stainless steel vessels ranging from 8,000–20,000 liters, heated and cooled through internal coils. Blade agitators revolving at 70–200 rpm are effective in stirring the low viscosity mobile reactants, which are maintained under an inert atmosphere of nitrogen or carbon dioxide during the reaction at temperatures up to 240° C.

Weigh tanks or meters measure the liquid glycols into the reactor. Solids are usually added from 25-kg bags or 1000-kg supersacks. Silo and auger are used widely for isophthalic acid, whereas phthalic anhydride and maleic anhydride are metered in molten form. A packed condenser efficiently separates water from glycol. The glycol is refluxed back into the reactor and the remaining condensate is incinerated on-site using a thermal oxidizer. Once the polymer is formed, it is cooled to below 180° C. and drained into a cooled blend tank containing styrene monomer under high agitation.

Glass-lined reactor systems are used occasionally for halogenated resins to prevent corrosion of the reactor components. Copper and brass fitting should be avoided due to the significant influence on resin cure characteristics.

Other glycols can be used to impart selective properties to these simple compositions. Ethylene glycol (EG) is used to a limited degree to reduce cost, whereas diethylene glycol (DEG) produces a more flexible polymer that can resist cracking when impacted. Neopentyl glycol (NPG) is used in most commercial products to improve uv and water resistance. Alkoxylated derivatives of bisphenol A (BPA) not only impart a high degree of resistance to strong acidic and alkaline environments, but also provide resistance to deformation and creep at elevated temperatures.

Long-chain aliphatic acids such as adipic acid are generally used to improve flexibility and enhance impact properties, demonstrating subtle improvements over resins modified with the ether glycols (diethylene glycol) and polyether glycols (polypropylene glycol).

In view of the features and advantages of the chemically resistant thermosetting resins having very low contents of volatile organic components in accordance with this invention, as compared to the known systems with reduced content of ethylenically unsaturated reactive solvent as previously used, the following examples are given. The following Examples will serve to illustrate certain specific embodiments of the herein-disclosed invention. These Examples should not, however, be construed as limiting the scope of the novel invention as there are many variations which may be made thereon without departing from the spirit of the disclosed invention, as those of skill in the art will recognize.

EXAMPLE 1

Preparation of unsaturated isopolyester of the invention was carried out in a four liter, glass reactor equipped for polyester synthesis with a mechanical stirrer, a steam-jacketed distillation column, a water-cooled condenser and a nitrogen sparger. Initially the reactor was charged with 1760 gm. (10.6 mole) of isophthalic acid, 1773 gm. (23.3 mole) of propylene glycol (PG), and 0.9 g (0.025 weight percent of total starting materials) of a commercial catalyst (FASCAT 4100 from Atochem). Nitrogen flow rate was 0.5 standard cubic feet per hour (SCFH). In about one hour of heating, the reaction mixture had reached a temperature of 170° C. Temperature of the mixture was gradually increased to 200° C. in order to maintain an adequate rate of reflux for separation of water by distillation. Progress of the esterification was monitored by acid number titration with 0.1 N KOH to a target acid number of about 10 mg KOH/gm of resin. After about 7 hours the acid number of 7.6 mg KOH/gm of resin was observed. Then, the melt of polymer was allowed to cool overnight to room temperature. Loss of propylene glycol by distillation was determined by measurement of refractive index of the condensate.

The polymer was heated to 150° C. Thereafter the following materials were charged into the reactor: 1039 g (10.6 mole) of melted maleic anhydride and makeup PG (33 g based on an 8% PG loss). Temperature of the reaction mixture was increased to 230° C. within about 1.5 hours. Water of reaction again was removed from the reactor, condensed and collected. After about 3.5 hours the polymer had been processed to acid number (AN) of 21 mg KOH/g. The polymer of esterification was cooled to a temperature of about 165° C.

Prior to the next step, 1 g of hydroquinone (150 ppm of solids) was added to the polymer of esterification in the reactor. At temperature of about 170° C., 193.4 g of glycidyl methacrylate (186 mL, 1.32 mol, 92% of theoretical based on GMA 97% ×0.95 equiv. per COOH endgroup) was added to the reactor in one portion of over a period of about 10 minutes. An accompanying exotherm of 1–2° C. was observed. In this example the weight ratio of glycidyl methacrylate to polymer of esterification was about 0.00229×AN of the polymer of esterification. In less than 1 hour the acid number of the unsaturated isopolyester had reached 3 mg KOH/g of unsaturated isopolyester, however the reaction was continued for an additional 1 hour to ensure completion. The acid number of the unsaturated isopolyester had reached 1 mg KOH/g. At that time, the hot, yellow, unsaturated isopolyester was poured into a foil tray and allowed to cool to a hard glassy solid.

Thermosetting resins were formed with the ethylenically unsaturated reactive solvent styrene. Unsaturated isopolyester was dissolved in styrene monomer at concentration of about 35, 40 and 50 weight percent styrene based upon the total of isopolyester and monomer. The compositions were identified as 1-35, 1-40 and 1-50. Brookfield viscosity of 1-35 was 1130 cps at 25° C., 1-40 was 420 cps, and 1-50 was 1150 cps. Test coupons were formed using 1% benzoyl peroxide (BPO) as an initiator, and cured in an oven according to the following schedule: overnight, 16 hours at about 57° C. (135° F.); 1 hour at about 82° C. (180° F.); 1 hour at about 104° C. (220° F.); and 1 hour at 120° C. (248° F.).

Test coupons were exposed in the following media: 1) boiling water for 100 hours, and 2) gasoline with 10% methanol at 22° C. The 100-hour exposure data for the boiling water test are given in Table II. For gasoline-methanol, representative coupons were removed and tested at one, two, three and four months. The data are reported for three-month exposure in Table III.

Laminate composites for corrosion testing were prepared according to ASTM C581. The resultant composites were 24wt. % reinforcement consisting of 2 plies of 1.5 oz glass mat surfaced with 10 mil "C" veils and 76% isopolyester resin. Each resin used a gel system of methyl ethyl ketone peroxide (MEKP, 9% active oxygen) promoted with cobalt octoate adjusted to give a pot life of about twenty minutes. The laminates were cured at room temperature overnight. Coupons were cut to size, 4 in. by 6 in., and engraved in the corner for future identification. The edges of the coupons were coated and the engraving was sealed with the same resin used in the composite. Sealing the edges of the coupons protected the fiberglass ends that were exposed when the panels were cut, so that wicking of the solutions into these areas of the coupon would not be a factor in the corrosion resistant testing. The coupons were then post cured at 100° C. for two hours and allowed to cool to room temperature. The total glass reinforcement content of each composite was determined according to ASTM procedures.

EXAMPLE 2

Another unsaturated isopolyester of the invention was prepared as described in Example 1 except that the weight ratio of glycidyl methacrylate to polymer of esterification was about 0.00115×AN of the polymer of esterification. Initially the four liter, glass reactor again was charged with 1760 gm. (10.6 mole) of isophthalic acid 1773 gm. (23.3 mole) of propylene glycol (PG), and 0.9 g (0.025 weight percent of total starting materials) of a commercial catalyst (FASCAT 4100 from Atochem). After about 7 hours an acid number of 19 mg KOH/gm of resin was observed.

The polymer was heated to 150° C. Thereafter the following materials were charged into the reactor: 1039 g (10.6 mole) of melted maleic anhydride and makeup PG The polymer was processed to acid number (AN) of 21 mg KOH/g.

After 1 g of hydroquinone (150 ppm of solids) was added to the polymer of esterification in the reactor, about 94 g of glycidyl methacrylate was added to the reactor. At completion of reaction the acid number of the unsaturated isopolyester had reached 10 mg KOH/g.

This unsaturated isopolyester was dissolved in styrene monomer at concentration of about 35 and 40 weight percent styrene based upon the total of isopolyester and monomer. The compositions were identified as 2-35 and 2-40. Brookfield viscosity of 2-35 was 1260 cps, and 2-40 was 450 cps. Test coupons were formed as described in Example 1.

EXAMPLE 3

Another unsaturated isopolyester of the invention was prepared as described in Example 1 except that the weight ratio of glycidyl methacrylate to polymer of esterification was about 0.00236×AN of the polymer of esterification. Initially the four liter, glass reactor again was charged with 1760 gm. (10.6 mole) of isophthalic acid, 1773 gm. (23.3 mole) of propylene glycol (PG), and 0.9 g (0.025 weight percent of total starting materials) of a commercial catalyst (FASCAT 4100 from Atochem). After about 7 hours the acid number of 9.4 mg KOH/gm of resin was observed.

The polymer was heated to 150° C. Thereafter the following materials were charged into the reactor: 1039 g (10.6 mole) of melted maleic anhydride and makeup PG The polymer was processed to acid number (AN) of 33 mg KOH/g.

After 1 g of hydroquinone (150 ppm of solids) was added to the polymer of esterification in the reactor, about 310 g of glycidyl methacrylate was added to the reactor. In less than 1 hour the acid number of the unsaturated isopolyester had reached 3.5 mg KOH/g of unsaturated isopolyester, however the reaction was continued for an additional 1 hour to ensure completion. The acid number of the unsaturated isopolyester had reached 4 mg KOH/g.

This unsaturated isopolyester was dissolved in styrene monomer at concentration of about 35, 40 and 50 weight percent styrene based upon the total of isopolyester and monomer. The compositions were identified as 3-35, 3-40 and 3-50. Brookfield viscosity of 3-35 was 420 cps, 3-40 was 165 and 3-50 was 60 cps. Test coupons were formed as described in Example 1.

EXAMPLE 4

Another unsaturated isopolyester of the invention was prepared as described in Example 3 except that the weight ratio of glycidyl methacrylate to polymer of esterification was about 0.00115×AN of the polymer of esterification. This unsaturated isopolyester was dissolved in styrene monomer at concentration of about 35, 40 and 50 weight percent styrene based upon the total of isopolyester and monomer. The compositions were identified as 4-35, 4-40 and 4-50. Brookfield viscosity of 4-35 was 740 cps, 4-40 was 265 and 4-50 was 70 cps. Test coupons were formed as described in Example 1.

Comparative Example A

Another unsaturated isopolyester of the invention was prepared as described in Example 1 except that no glycidyl methacrylate was reacted with the polymer of esterification. Initially the four liter, glass reactor again was charged with 1760 gm. (10.6 mole) of isophthalic acid, 1773 gm. (23.3 mole) of propylene glycol (PG), and 0.9 g (0.025 weight percent of total starting materials) of a commercial catalyst (FASCAT 4100 from Atochem). After about 7 hours the acid number of 9.6 mg KOH/gm of resin was observed.

The polymer was heated to 150° C. Thereafter the following materials were charged into the reactor: 1039 g (10.6 mole) of melted maleic anhydride and makeup PG The polymer was processed to acid number (AN) of 28 mg KOH/g.

This unsaturated isopolyester was dissolved in styrene monomer at concentration of about 35, 40 and 50 weight percent styrene based upon the total of isopolyester and monomer. The compositions were identified as A-35, A-40 and A-50. Brookfield viscosity of A-35 was 590 cps, A-40 was 210 cps, and A-50 was 65 cps at 25° C. Test coupons were formed as described in Example 1.

Comparative Example B

Another unsaturated isopolyester of the invention was prepared as described in Example 1 except that no glycidyl methacrylate was reacted with the polymer of esterification. Initially the four liter, glass reactor again was charged with 1760 gm. (10.6 mole) of isophthalic acid, 1773 gm. (23.3 mole) of propylene glycol (PG), and 0.9 g (0.025 weight percent of total starting materials) of a commercial catalyst (FASCAT 4100 from Atochem). After about 7 hours the acid number of 8.6 mg KOH/gm of resin was observed.

The polymer was heated to 150° C. Thereafter the following materials were charged into the reactor: 1039 g (10.6 mole) of melted maleic anhydride and makeup PG The polymer was processed to acid number (AN) of 21 mg KOH/g.

This unsaturated isopolyester was dissolved in styrene monomer at concentration of about 40 and 50 weight percent styrene based upon the total of isopolyester and monomer. The compositions were identified as B-40 and B-50. Brookfield viscosity of A-40 was 380 cps, and A-50 was 85 cps at 25° C. Test coupons were formed as described in Example 1.

Initial physical properties of untreated clearcast panels are reported in Table I. Results of water boil testing at 100 hours exposure and chemical resistance to gasoline-methanol (90/10 percent by volume) at 12 weeks exposure are reported in Tables II and III.

Laminar composite panels for corrosion testing were prepared according to ASTM C581. The Laminate composites were 24 wt.% reinforcement which consisted of 2 plies of 1.5 oz glass mat surfaced with 10 mil "C" veils and 76% resin. Each resin used a gel system of methyl ethyl ketone peroxide (MEKP, 9% active oxygen) promoted with cobalt octoate adjusted to give a pot life of about twenty minutes. The laminates were cured at room temperature overnight. Coupons were cut to size, 4 in. by 6 in., and engraved in the corner for identification. The edges of the coupons were coated and the engraving was sealed with the same resin used in the composite. Sealing the edges of the coupons protected the fiberglass ends that were exposed when the panels were cut, so that wicking of the solutions into these areas of the coupon would not be a factor in the corrosion resistant testing. The coupons were then post cured at 100° C. for two hours and allowed to cool to room temperature. The total glass reinforcement content of each composite was determined according to ASTM procedures.

Laminar composite panels of isopolyester resins of Examples 1, 2, 3 and B, designated as 1-40L, 2-40L, 3-40L and B-40L, were immersed in various chemicals. Samples were removed at one-month intervals for testing. In most corrosive chemicals, this isopolyester resin provided excellent resistance.

Initial flexural properties and Barcol Hardness were determined by testing specimens of each formulation. Initial physical data and results for the first month of exposure at 22° C. to gasoline-methanol (90/10 percent by volume) are reported in Tables IV and V.

TABLE I

Physical Properties of Untreated Clearcast Panels

| Example No. | HDT @ 264 psi, ° C. | Flexural Modulus, psi | Flexural Strength, psi | Barcol Hardness |
|---|---|---|---|---|
| 1-35 | 107 | 568,000 | 22,800 | 47–50 |
| 3-35 | 98 | 590,000 | 23,000 | 48–52 |
| 4-35 | 102 | 589,000 | 22,300 | 48–50 |
| 1-40 | 117 | 531,000 | 20,600 | 49–51 |
| 3-40 | 102 | 578,000 | 19,000 | 48–50 |
| 4-40 | 103 | 575,000 | 21,300 | 47–50 |
| A-40 | 89 | 588,000 | 19,300 | 49–51 |
| B-40 | 102 | 560,000 | 21,000 | 49–51 |
| 1-50 | 116 | 512,000 | 19,900 | 47–48 |
| 3-50 | NA | 544,000 | 21,000 | 47–49 |
| 4-50 | 104 | 564,000 | 21,700 | 46–48 |
| A-50 | NA | 565,000 | 20,100 | 47–49 |
| B-50 | 105 | 531,000 | 21,900 | 47–48 |

TABLE II

Retention of Physical Properties of Clearcast Panels
Water Boil Test, 100 Hours Exposure

| Example No. | Weight Gain, Percent | Flexural Modulus, Percent Ret'n | Flexural Strength, Percent Ret'n | Barcol Hardness, Percent Ret'n |
|---|---|---|---|---|
| 1-35 | 1.5 | 84 | 32 | 82 |
| 3-35 | 1.9 | 79 | 29 | 76 |
| 4-35 | 2.1 | 78 | 22 | 80 |
| 1-40 | 1.3 | 93 | 64 | 84 |
| 3-40 | 1.7 | 85 | 57 | 84 |
| 4-40 | 1.8 | 81 | 46 | 82 |
| A-40 | 2.7 | 70 | 31 | 77 |
| B-40 | 1.8 | 88 | 47 | 82 |
| 1-50 | 1.0 | 97 | 73 | 85 |
| 3-50 | 1.3 | 91 | 63 | 90 |

TABLE II-continued

Retention of Physical Properties of Clearcast Panels
Water Boil Test, 100 Hours Exposure

| Example No. | Weight Gain, Percent | Flexural Modulus, Percent Ret'n | Flexural Strength, Percent Ret'n | Barcol Hardness, Percent Ret'n |
|---|---|---|---|---|
| 4-50 | 1.4 | 85 | 50 | 83 |
| A-50 | 2.1 | 78 | 40 | 77 |
| B-50 | 1.3 | 95 | 58 | 83 |

TABLE III

Retention of Physical Properties of Clearcast Panels
Chemical Resistance to Gasoline-Methanol, 12 Weeks Exposure

| Example No. | Weight Gain, Percent | Flexural Modulus, Percent Ret'n | Flexural Strength, Percent Ret'n | Barcol Hardness, Percent Ret'n |
|---|---|---|---|---|
| 1-35 | 1.3 | 89 | 94 | 80 |
| 3-35 | 2.4 | 63 | 77 | 46 |
| 4-35 | 3.2 | 53 | 72 | 34 |
| 1-40 | 2.1 | 78 | 95 | 67 |
| 3-40 | 4.4 | 44 | 64 | 17 |
| 4-40 | 2.9 | 61 | 80 | 43 |
| A-40 | 12.4 | 6 | 17 | 0 |
| B-40 | 4.8 | 40 | 53 | 15 |

TABLE IV

Physical Properties of Untreated Laminar Composite Panels

| Example No. | 60/20 Gloss | Flexural Modulus, psi | Flexural Strength, psi | Barcol Hardness |
|---|---|---|---|---|
| 1-40L | 82/40 | 815,000 | 17,000 | 54 |
| 2-40L | 88/67 | 902,000 | 18,000 | 50 |
| 3-40L | 89/76 | 884,000 | 18,000 | 51 |
| B-40L | 89/63 | 821,000 | 16,000 | 53 |

TABLE V

Retention of Physical Properties of Laminar Composite Panels
Chemical Resistance to Gasoline-Methanol, 1 Month Exposure

| Example No. | 60/20 Gloss, Percent Retained | Flexural Modulus, Percent Ret'n | Flexural Strength, Percent Ret'n | Barcol Hardness, Percent Ret'n |
|---|---|---|---|---|
| 1-40L | 96 | 85 | 91 | 69 |
| 2-40L | 93 | 73 | 79 | 93 |
| 3-40L | 91 | 61 | 66 | 41 |
| B-40L | 97 | 66 | 80 | 42 |

For the purposes of the present invention, "minor amount" is defined as less than about fifty percent and "major amount" is defined as more than about fifty percent. "Substantially" is defined as occurring with sufficient frequency or being present in such proportions as to measurably affect macroscopic properties of an associated compound or system. Where the frequency or proportion for such impact is not clear, substantially is to be regarded as about twenty per cent or more. The term "essentially" is defined as absolutely except that small variations which have no more than a negligible effect on macroscopic qualities and final outcome are permitted, typically up to about one percent.

Examples have been presented and hypotheses advanced herein in order to better communicate certain facets of the That which is claimed is:

1. A chemically resistant thermosetting resin, having low contents of volatile organic components comprising:
    about 35 to about 45 parts by weight of ethylenically unsaturated reactive solvent; and
    about 65 to about 55 parts by weight of an unsaturated polyester produced by a process comprising:
        initially condensing dihydric alcohol containing from 2 to 10 carbon atoms and isophthalic acid while distilling off water of condensation to form a melt of polymer having an acid number in a range from about 5 to about 15 mg KOH/g polymer,
        then condensing the polymer and maleic anhydride while distilling off water of condensation to form a polymer of esterification having an acid number, AN, in a range from about 10 to about 30 mg KOH/g polymer, and
        further reacting the polymer of esterification with an amount of glycidyl methacrylate provide a weight ratio of glycidyl methacrylate to condensation polymer in a range of from about 0.001 AN to about 0.005 AN to form unsaturated isopolyester having an acid number in a range from about 1 to about 15 mg KOH/g of unsaturated polyester; and
    the thermosetting resin exhibits a Brookfield viscosity of less than about 1500 cps at 25° C.

2. The chemically resistant thermosetting resin according to claim 1 wherein the ethylenically unsaturated reactive solvent comprises styrene or vinyl toluene, and the amount of ethylenically unsaturated reactive solvent is in a range of from 25 to 45 percent by weight of the resin.

3. The chemically resistant thermosetting resin according to claim 1 wherein the dihydric alcohol is at least one member of the group consisting of ethylene glycol, propylene glycol, neopentyl glycol, 1,3-butane diol, 1,4-butane diol, diethylene glycol, dipropylene glycol, trimethylpentane diol.

4. The chemically resistant thermosetting resin according to claim 3 wherein the unsaturated polyester has an acid number in a range from about 1 to about 5 mg KOH/g of unsaturated polyester.

5. The chemically resistant thermosetting resin according to claim 4 wherein the dihydric alcohol is at least one member of the group consisting of ethylene glycol, propylene glycol, neopentyl glycol, 1,3-butane diol, 1,4-butane diol, diethylene glycol.

6. The chemically resistant thermosetting resin according to claim 1 wherein the ethylenically unsaturated reactive solvent is at least one member of the group consisting of styrene, vinyl toluene, t-butylstyrene, chlorostyrene, divinyl benzene, α-methylstyrene, diacetone-acrylamide, hydroxyethyl acrylate, methacrylate, methyl methacrylate, butyl methacrylate, and butyl acrylate; the dihydric alcohol is at least one member of the group consisting of ethylene glycol, propylene glycol, neopentyl glycol, 1,3-butane diol, 1,4-butane diol, diethylene glycol, dipropylene glycol, trimethylpentane diol, and trimethylene diol; and the thermosetting resin has a Brookfield viscosity of less than about 1200 cps at 25° C.

7. The chemically resistant thermosetting resin according to claim 6 wherein the amount of glycidyl methacrylate provides a weight ratio of glycidyl methacrylate to condensation polymer is in a range of from about 0.002 AN to about 0.004 AN to form unsaturated isopolyester having an acid number in a range downward from about 10 mg KOH/g of unsaturated polyester.

8. The composition according to claim 7 wherein the unsaturated polyester has an acid number in a range from about 1 to about 5 mg KOH/g of unsaturated polyester.

9. The composition according to claim 1 wherein the ethylenically unsaturated reactive solvent comprises styrene, the dihydric alcohol is propylene glycol, unsaturated isopolyester has an acid number in a range from about 1 to about 5 mg KOH/g unsaturated polyester.

10. A composite composition having resistance to chemical attack comprising:
    about 25 to about 500 parts by weight of fibrous reinforcement material and/or filler;
    about 35 to about 45 parts by weight of ethylenically unsaturated reactive solvent; and
    about 65 to about 55 parts by weight of an unsaturated polyester produced by a process comprising:
        initially condensing dihydric alcohol containing from 2 to 10 carbon atoms and isophthalic acid while distilling off water of condensation to form a melt of polymer having an acid number in a range from about 5 to about 15 mg KOH/g polymer,
        then condensing the polymer and maleic anhydride while distilling off water of condensation to form a polymer of esterification having an acid number, AN, in a range from about 15 to about 25 mg KOH/g polymer, and
        further reacting the polymer of esterification with an amount of glycidyl methacrylate provide a weight ratio of glycidyl methacrylate to condensation polymer in a range of from about 0.0025 AN to about 0.004 AN to form unsaturated isopolyester having an acid number in a range from about 1 to about 10 mg KOH/g unsaturated polyester.

11. The composition according to claim 10 wherein the fibrous reinforcement material is at least one member of the group consisting of glass, carbon, acrylic, aramid and polyester fibers.

12. The composition according to claim 10 wherein the composite is a laminar composite, and the fibrous reinforcement material is glass and/or carbon fiber.

13. The composition according to claim 10 wherein the filler is at least one member of the group consisting of carbon black, silica, talc, metallic oxides and metallic carbonates.

* * * * *

UNITED STATES PATENT AND TRADEMARK OFFICE
CERTIFICATE OF CORRECTION

PATENT NO. : 6,358,620 B1
DATED : March 19, 2002
INVENTOR(S) : Howard B. Yokelson, James Van Fleet and Karen E. Medema It is certified that error appears in the above-identified patent and that said Letters Patent is hereby corrected as shown below:

<u>Title page,</u>
Item [57], ABSTRACT,
Lines 5-6, "which comprises; (a) condensing" should read -- which comprises: (a) condensing --

<u>Column 1,</u>
Line 55, "have increased need for" should read -- have increased the need for --

<u>Column 2,</u>
Line 4, "with styrene as dilutent" should read -- with styrene as diluent --
Line 27, "corrosive environments" should read -- corrosive environments. --
Line 47, "solvent, (ii) a major" should read -- solvent, and (ii) a major --

<u>Column 3,</u>
Line 15, "acid and or anhydride" should read -- acid and/or anhydride --

<u>Column 4,</u>
Line 6, "solvent that copolymerize with" should read -- solvents that copolymerize with --
Line 11, "methacrylate, methyl" should read -- methyl acrylate, methyl --
Line 32, "propylene glycol, neopentyl glycol." should read -- propylene glycol, and neopentyl glycol. --
Line 36, "Polycarboxlyic acids that are" should read -- Polycarboxylic acids that are --
Line 43, "and acid halides that contain" should read -- and acid halides, that contain --
Line 66, "requirements a given styrene" should read -- requirements at a given styrene --

<u>Column 6,</u>
Line 23, "one portion of over a period" should read -- one portion over a period --

<u>Column 7,</u>
Line 21, "and makeup PG The" should read -- and makeup PG. The --
Line 50, "and makeup PG The" should read -- and makeup PG. The --

<u>Column 8,</u>
Line 27, "and makeup PG The" should read -- and makeup PG. The --
Line 51, "and makeup PG The" should read -- and makeup PG. The --

UNITED STATES PATENT AND TRADEMARK OFFICE
CERTIFICATE OF CORRECTION

PATENT NO. : 6,358,620 B1
DATED : March 19, 2002
INVENTOR(S) : Howard B. Yokelson, James Van Fleet and Karen E. Medema It is certified that error appears in the above-identified patent and that said Letters Patent is hereby corrected as shown below:

<u>Column 10,</u>
Line 61, "twenty per cent or more." should read -- twenty percent or more. --

<u>Column 12,</u>
Line 8, "polymer is in a range of" should read -- polymer in a range of --
Lines 17 and 18, "propylene glycol, unsaturated" should read -- propylene glycol, and the unsaturated --

Signed and Sealed this

Thirtieth Day of July, 2002

*Attest:*

*Attesting Officer*

JAMES E. ROGAN
*Director of the United States Patent and Trademark Office*